(12) United States Patent
Mazur et al.

(10) Patent No.: US 12,110,820 B2
(45) Date of Patent: *Oct. 8, 2024

(54) GAS TURBINE ENGINE CENTRIFUGAL COMPRESSOR WITH IMPELLER LOAD AND COOLING CONTROL

(71) Applicant: Rolls-Royce North American Technologies, Inc., Indianapolis, IN (US)

(72) Inventors: Steven Mazur, Indianapolis, IN (US); Rex M. Little, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,447

(22) Filed: Sep. 1, 2023

(65) Prior Publication Data

US 2024/0035414 A1    Feb. 1, 2024

Related U.S. Application Data

(63) Continuation of application No. 17/874,213, filed on Jul. 26, 2022, now Pat. No. 11,773,773.

(51) Int. Cl.
| | |
|---|---|
| *F02C 3/14* | (2006.01) |
| *F01D 25/12* | (2006.01) |
| *F02C 3/08* | (2006.01) |
| *F02C 6/08* | (2006.01) |

(52) U.S. Cl.
CPC ............... *F02C 3/14* (2013.01); *F01D 25/12* (2013.01); *F02C 3/08* (2013.01); *F02C 6/08* (2013.01)

(58) Field of Classification Search
CPC . F01D 9/023; F01D 9/06; F01D 25/12; F01D 2240/35; F01D 2240/55; F01D 2260/232; F01D 2260/606; F02C 3/08; F02C 3/09; F02C 3/14; F02C 6/08; F02C 7/28
See application file for complete search history.

(56) References Cited

U.S. PATENT DOCUMENTS

| | | |
|---|---|---|
| 2,777,395 A | 1/1957 | Disbrow |
| 4,256,436 A | 3/1981 | Fandrey et al. |
| 4,459,802 A | 7/1984 | Mowill |
| 4,462,204 A | 7/1984 | Hull |
| 4,761,947 A | 8/1988 | Hennecke et al. |
| 4,786,238 A | 11/1988 | Glaser et al. |
| 5,147,178 A | 9/1992 | Treece |
| 5,224,822 A | 7/1993 | Lenahan et al. |
| 5,385,442 A | 1/1995 | Lehe et al. |
| 5,555,721 A | 9/1996 | Bourneuf et al. |

(Continued)

*Primary Examiner* — Ehud Gartenberg
*Assistant Examiner* — Henry Ng
(74) *Attorney, Agent, or Firm* — Barnes & Thornburg LLP

(57) ABSTRACT

A gas turbine engine includes a compressor, a combustor, and a turbine. The compressor compresses gases entering the gas turbine engine. The combustor receives the compressed gases from the compressor and mixes fuel with the compressed gases. The turbine receives the hot, high pressure combustion products created by the combustor by igniting the fuel mixed with the compressed gases. The turbine extracts mechanical work from the hot, high pressure combustion products to drive the compressor and a fan, shaft, or propeller.

16 Claims, 5 Drawing Sheets

(56) References Cited

U.S. PATENT DOCUMENTS

| | | | |
|---|---|---|---|
| 5,996,331 A | 12/1999 | Palmer | |
| 6,035,627 A | 3/2000 | Liu | |
| 6,190,123 B1 | 2/2001 | Wunderwald et al. | |
| 6,227,801 B1 | 5/2001 | Liu | |
| 6,234,746 B1 | 5/2001 | Schroder et al. | |
| 6,238,179 B1 | 5/2001 | Wunderwald et al. | |
| 6,257,834 B1 | 7/2001 | Bremer et al. | |
| 6,276,896 B1 | 8/2001 | Burge et al. | |
| 6,513,335 B2 | 2/2003 | Fukutani | |
| 6,540,477 B2* | 4/2003 | Glynn | F01D 5/18 415/115 |
| 6,585,482 B1 | 7/2003 | Liotta et al. | |
| 6,966,191 B2 | 11/2005 | Fukutani et al. | |
| 7,093,418 B2* | 8/2006 | Morris | F02C 7/28 60/39.08 |
| 7,287,384 B2 | 10/2007 | Fish et al. | |
| 7,341,429 B2* | 3/2008 | Montgomery | F01D 5/082 415/115 |
| 7,363,762 B2* | 4/2008 | Montgomery | F04D 29/284 29/889.22 |
| 7,624,580 B2 | 12/2009 | Fukutani | |
| 7,682,131 B2 | 3/2010 | Legare et al. | |
| 7,775,758 B2 | 8/2010 | Legare | |
| 7,775,763 B1 | 8/2010 | Johnson et al. | |
| 7,827,798 B2 | 11/2010 | Commaret et al. | |
| 7,841,187 B2 | 11/2010 | Behaghel et al. | |
| 7,857,581 B2* | 12/2010 | Mons | F01D 11/02 415/173.5 |
| 7,942,630 B2 | 5/2011 | Argaud et al. | |
| 8,029,238 B2 | 10/2011 | Argaud et al. | |
| 8,075,247 B2 | 12/2011 | Romani et al. | |
| 8,087,249 B2 | 1/2012 | Ottaviano et al. | |
| 8,147,178 B2 | 4/2012 | Ottaviano et al. | |
| 8,177,475 B2 | 5/2012 | Joco et al. | |
| 8,226,353 B2 | 7/2012 | Argaud et al. | |
| 8,336,317 B2 | 12/2012 | Blanchard et al. | |
| 8,402,770 B2 | 3/2013 | Garin et al. | |
| 8,529,195 B2 | 9/2013 | Widener | |
| 8,800,291 B2 | 8/2014 | Bil et al. | |
| 8,938,975 B2 | 1/2015 | Behaghel et al. | |
| 9,003,793 B2 | 4/2015 | Begin et al. | |
| 9,228,497 B2 | 1/2016 | Ottow et al. | |
| 9,650,916 B2 | 5/2017 | Barton et al. | |
| 9,683,488 B2 | 6/2017 | Ress, Jr. et al. | |
| 10,359,051 B2 | 7/2019 | Gage et al. | |
| 10,415,391 B2 | 9/2019 | Duong et al. | |
| 10,781,751 B1 | 9/2020 | Jones et al. | |
| 10,830,144 B2 | 11/2020 | Lambert et al. | |
| 11,619,170 B1 | 4/2023 | Dierksmeier et al. | |
| 2010/0154433 A1 | 6/2010 | Ottaviano et al. | |
| 2010/0158668 A1 | 6/2010 | Ottaviano et al. | |
| 2017/0254269 A1* | 9/2017 | Snyder | F02C 7/224 |
| 2018/0066579 A1 | 3/2018 | Lambert et al. | |
| 2018/0066585 A1 | 3/2018 | Lambert et al. | |
| 2018/0291928 A1 | 10/2018 | Kenworthy et al. | |
| 2019/0063324 A1 | 2/2019 | Gould et al. | |
| 2021/0293180 A1 | 9/2021 | Whitlock et al. | |
| 2022/0018361 A1 | 1/2022 | Mazur | |

* cited by examiner

GAS TURBINE ENGINE CENTRIFUGAL COMPRESSOR WITH IMPELLER LOAD AND COOLING CONTROL

CROSS REFERENCE TO RELATED APPLICATIONS

This application is a continuation of and claims priority to and the benefit of U.S. patent application Ser. No. 17/874,213, filed 26 Jul. 2022, the disclosure of which is now expressly incorporated herein by reference.

FIELD OF THE DISCLOSURE

The present disclosure relates generally to gas turbine engines, and more specifically to gas turbine engines including centrifugal compressors.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

The impellers of centrifugal compressors are loaded axially by air pressure acting on the impellers. Such loads may change in direction and magnitude over different operating conditions of the gas turbine engine. It may be desirable to control the loads acting on the impeller so that at least a minimal net load is applied to the impeller in a single axial direction for all operating conditions to avoid the net load changing direction during operation of the gas turbine engine over the different operating conditions. It may also be desirable to direct air from the centrifugal compressor to the turbine for cooling turbine components during operation of the gas turbine engine to improve turbine life and performance.

SUMMARY

The present disclosure may comprise one or more of the following features and combinations thereof.

A turbine engine may comprise a centrifugal compressor, a combustor, and a turbine. The centrifugal compressor may include an impeller having an impeller disk and impeller blades that extend from the impeller disk. The impeller may be configured to rotate about an axis to produce compressor discharge air. The combustor may include an outer combustor case and an inner combustor case. The outer combustor case may be arranged around the axis. The inner combustor case may be arranged radially along an aft side of the impeller disk and may extend axially aft relative to the axis.

In some embodiments, the turbine may include a rotor assembly and a turbine blade. The rotor assembly may be mounted for rotation about the axis. The turbine blade may be coupled with the rotor assembly for rotation therewith. The turbine blade may define an inner radial boundary of a gas path of the turbine. The rotor assembly may include a body, a first sealing element, and a second sealing element. The first sealing element may be coupled with the body and may engage the inner combustor case at a first location. The second sealing element may be coupled with the body and may engage the inner combustor case at a second location. An air plenum may be defined between the first sealing element and the second sealing element. The second sealing element may fluidly separate the air plenum from a wheel cavity defined between the inner combustor case and the rotor assembly. The wheel cavity may open into the gas path of the turbine.

In some embodiments, the inner combustor case may be formed to include a cooling hole that extends through the inner combustor case. The cooling hole may open directly into the wheel cavity to direct a first portion of the compressor discharge air through the wheel cavity and into the gas path of the turbine.

In some embodiments, the inner combustor case may be formed to define a passageway that extends through the inner combustor case and opens into the air plenum to direct a second portion of the compressor discharge air from the combustor directly into the air plenum. The rotor assembly may be formed to include a hole that allows the second portion of the compressor discharge air in the air plenum to flow out of the air plenum and into the rotor assembly to cool the rotor assembly of the turbine.

In some embodiments, the cooling hole may extend axially through the inner combustor case and the first portion of the compressor discharge air in the wheel cavity may flow radially outwardly into the gas path. The inner combustor case may be formed to include a bleed hole arranged radially inwardly from outlet tips of the impeller blades to allow a flow of bleed air that is bled from the compressor discharge air to pass through the bleed hole and along the inner combustor case.

In some embodiments, the combustor may further include a manifold arranged along the inner combustor case and shaped to define a channel formed radially between the inner combustor case and the manifold and the flow of bleed air may be conducted into the channel. The channel may conduct a first portion of the flow of bleed air directly into the wheel cavity. The aft side of the impeller disk and the inner combustor case may cooperate to define a back cavity therebetween. The first sealing element may fluidly separate the air plenum from the back cavity.

In some embodiments, the inner combustor case may be formed to include a metering hole that extends through the inner combustor case and is in fluid communication with the back cavity to transmit a second portion of the flow of bleed air from the channel into the back cavity. The bleed hole, the metering hole, and the back cavity may be fluidly unobstructed to allow the second portion of the flow of bleed air to circulate from the metering hole, through the back cavity, and into the bleed hole.

According to another aspect of the present disclosure, a turbine engine may comprise a centrifugal compressor, a combustor, and a rotating turbine wheel assembly. The centrifugal compressor may include an impeller having an impeller disk and impeller blades that extend from the impeller disk. The impeller may be configured to rotate about an axis to produce compressor discharge air. The combustor may be arranged to receive the compressor discharge air. The combustor may include an inner combustor case arranged at least along an aft side of the impeller disk. The rotating turbine wheel assembly may be configured for rotation about the axis. The rotating turbine wheel assembly may include a turbine blade and a first sealing element. The turbine blade may be located in a gas path of the turbine engine. The first sealing element may cooperate with the inner combustor case to define a wheel cavity having an outlet that opens into the gas path. The inner combustor case may be formed to include a cooling hole that extends through the inner combustor case and opens directly into the wheel cavity to direct a first portion of the compressor discharge air from the combustor into the wheel cavity.

In some embodiments, the rotating turbine wheel assembly may further include a second sealing element that cooperates with the inner combustor case to define an air plenum between the first sealing element and the second sealing element. The second sealing element may fluidly separate the air plenum from the wheel cavity.

In some embodiments, the inner combustor case may be formed to define a passageway that extends through the inner combustor case and opens directly into the air plenum to direct a second portion of the compressor discharge air from the combustor into the air plenum. The rotating turbine wheel assembly may include a rotor coupled with the turbine blade and a cover plate coupled with the rotor. The cover plate may be formed to include a hole that extends through the cover plate to direct the second portion of the compressor discharge air from the air plenum toward the rotor.

In some embodiments, the inner combustor case may include a forward case and an aft case. The forward case may have a radially extending portion and an axially extending portion. The radially extending portion may extend radially along the aft side of the impeller disk. The axially extending portion may extend axially aft from the radially extending portion. The aft case may have a first seal land and an annular body. The first seal land may interface with the first sealing element. The annular body may be coupled with the forward case. The cooling hole may extend through the annular body of the aft case of the inner combustor case.

In some embodiments, the combustor may further include a manifold arranged along the inner combustor case and shaped to define a channel formed radially between the inner combustor case and the manifold. The inner combustor case may be formed to include a bleed hole arranged radially inwardly from outlet tips of the impeller blades. The bleed hole may open fluidly into the channel. The channel may be in fluid communication with the wheel cavity.

A method may comprise rotating an impeller about an axis to produce compressor discharge air. The impeller may have an impeller disk and impeller blades that extend away from the impeller disk. The method may comprise discharging the compressor discharge air from outlet tips of the impeller blades. The method may comprise directing a first portion of the compressor discharge air through a cooling hole formed in an inner combustor case and into a wheel cavity defined by the inner combustor case and a rotating turbine wheel assembly. The method may comprise directing a second portion of the compressor discharge air through a passageway formed in the inner combustor case and into an air plenum that is separated from the wheel cavity by a sealing element. The method may comprise directing the first portion of the compressor discharge air out of the wheel cavity through an outlet that opens into a gas path of the rotating turbine wheel assembly.

In some embodiments, the method may comprise bleeding bleed air from the outlet tips of the impeller blades through a plurality of bleed holes formed in the inner combustor case and into a channel defined by the inner combustor case and a manifold coupled with the inner combustor case. The plurality of bleed holes may be located radially inward of the outlet tips of the impeller blades relative to the axis. The method may comprise directing a first portion of the bleed air from the channel into the wheel cavity.

These and other features of the present disclosure will become more apparent from the following description of the illustrative embodiments.

DETAILED DESCRIPTION OF THE DRAWINGS

Figure 1:
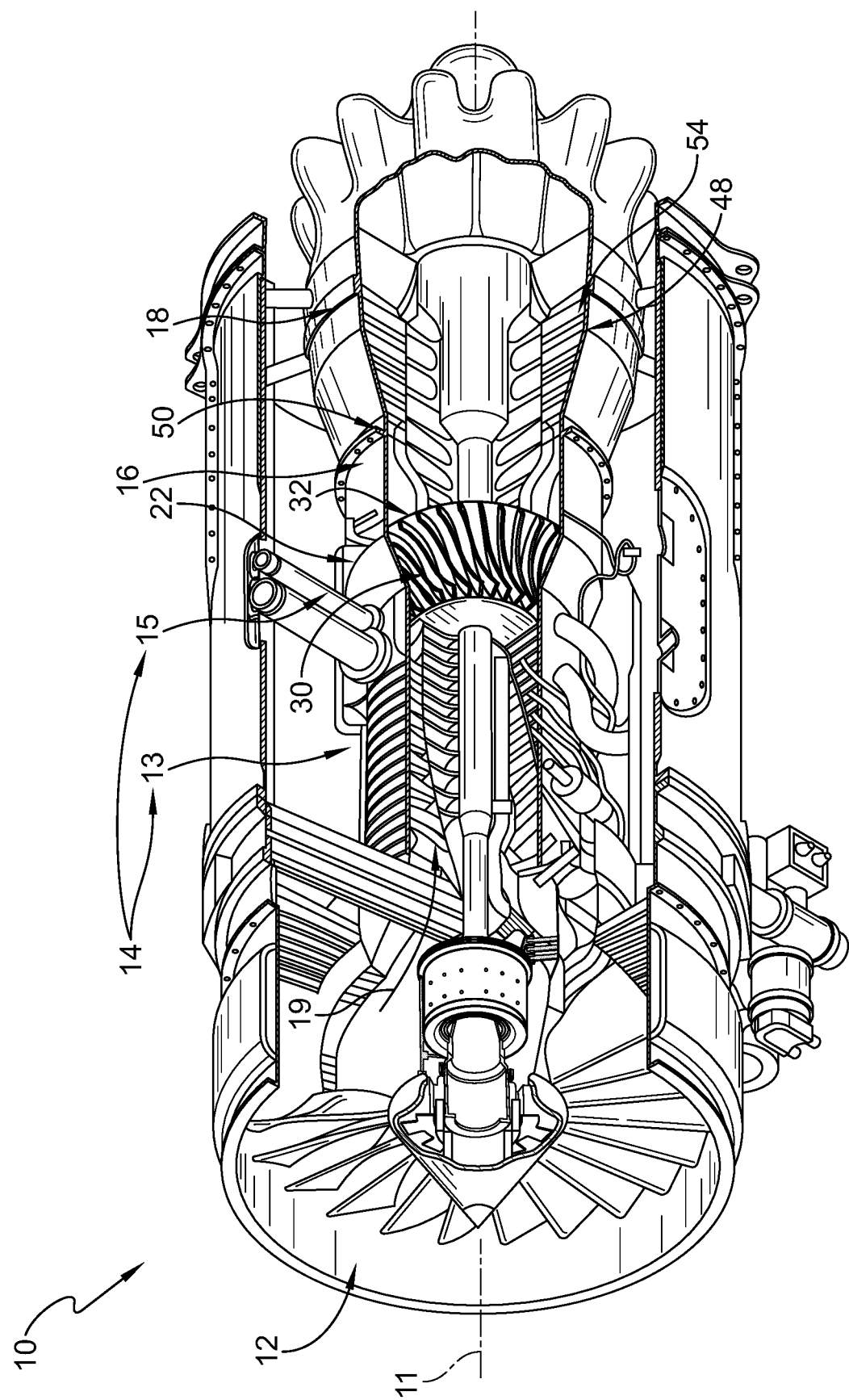
FIG. 1 is a cut away perspective view of a gas turbine engine showing the engine includes a fan, an axi-centrifugal compressor, a combustor fluidly coupled to the compressor, and a turbine fluidly coupled to the combustor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12, an axi-centrifugal compressor 14, a combustor 16 fluidly coupled to the compressor 14, and a turbine 18 fluidly coupled to the combustor 16 as shown in FIGS. 1-4. The fan 12 is driven by the turbine 18 and provides thrust for propelling an aircraft. The compressor 14 compresses gases entering the gas turbine engine 10 along a core flow path (represented by arrows 19). The compressor 14 delivers compressed gases 21 to the combustor 16. The combustor 16 mixes fuel with the compressed gases and ignites the fuel to produce hot, high pressure combustion products. The hot, high pressure combustion products of the combustion reaction in the combustor 16 are directed into the turbine 18 to cause the turbine 18 to rotate about an axis 11 of the gas turbine engine 10. The turbine 18 extracts mechanical work from the hot, high pressure combustion products to drive the compressor 14 and the fan 12.

Figure 2:
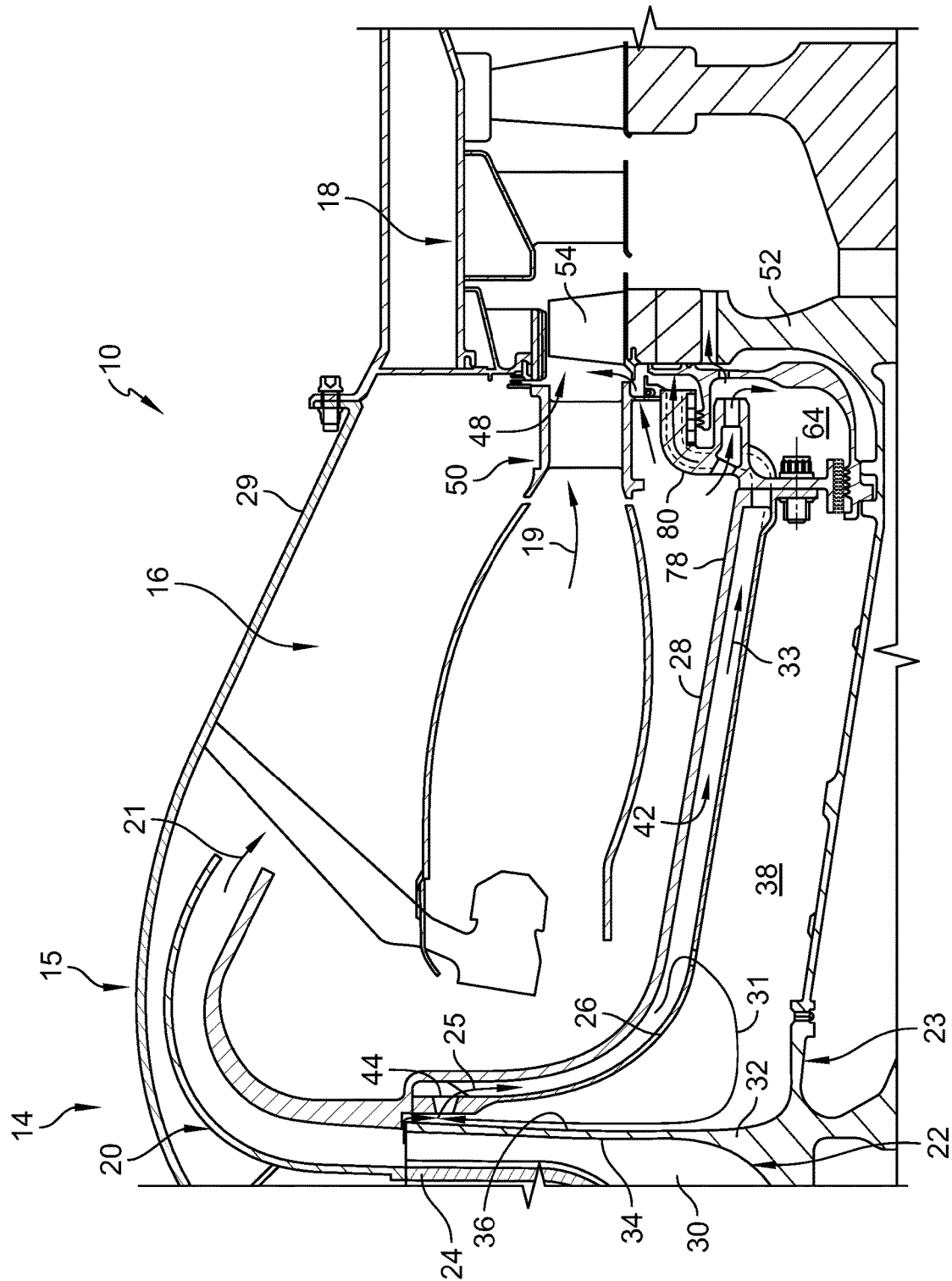
FIG. 2 is a cross section view of the gas turbine engine of FIG. 1 showing the axi-centrifugal compressor includes a centrifugal compressor having an impeller and that the combustor includes an inner combustor case and a manifold that cooperate to direct cooling air away from the impeller and into cavities between the impeller and the inner combustor case and between the inner combustor case and the turbine.
Figure 3:
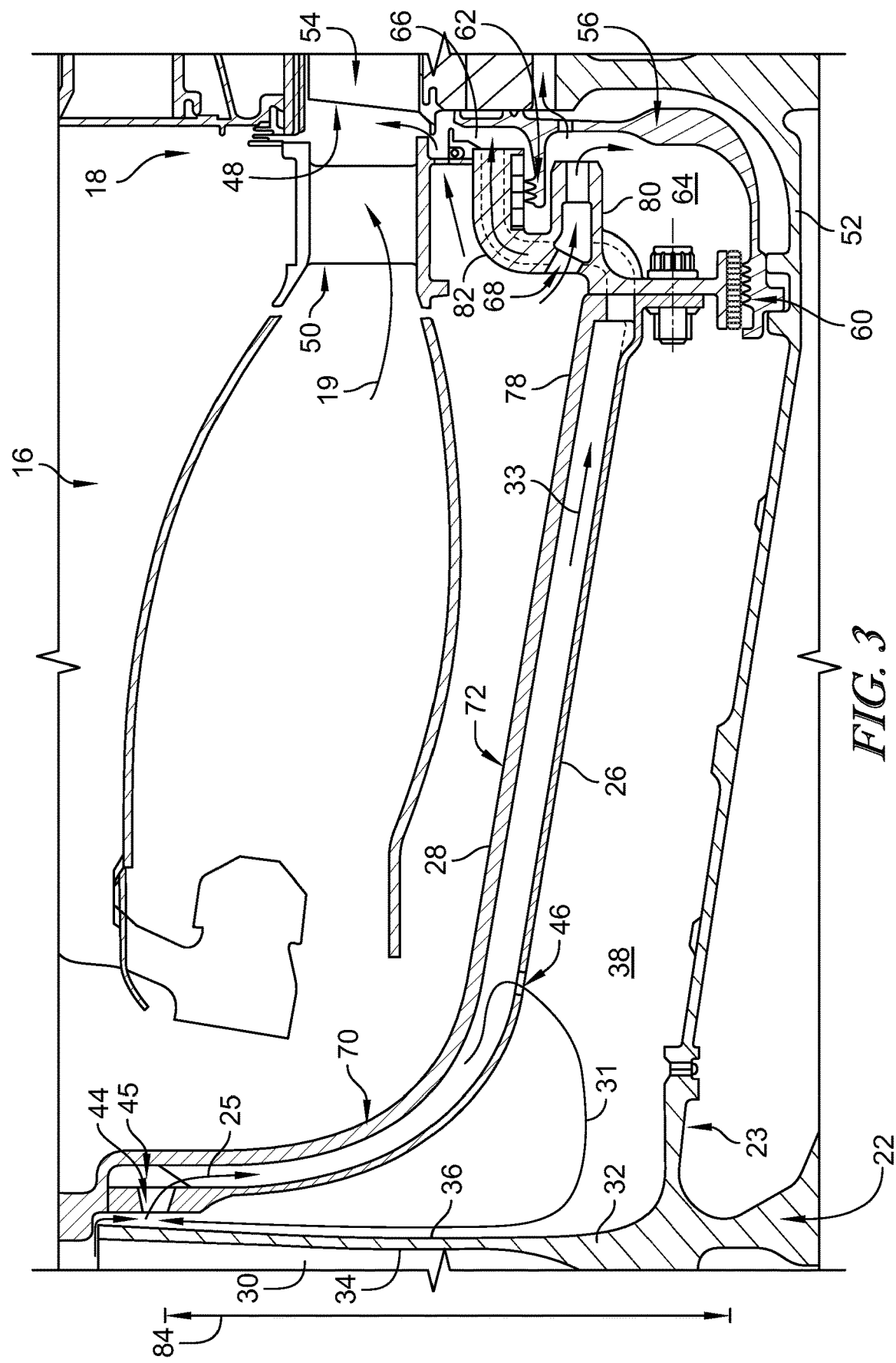
FIG. 3 is an enlarged cross section view of the gas turbine engine of FIG. 1 showing the inner combustor case and the manifold cooperate to define a plurality of channels for receiving the cooling air and that the inner combustor case is formed to define a plurality of holes and passages for directing the cooling air out of the channels and into the plurality of cavities defined by the impeller, inner combustor case, and turbine.
Figure 4:
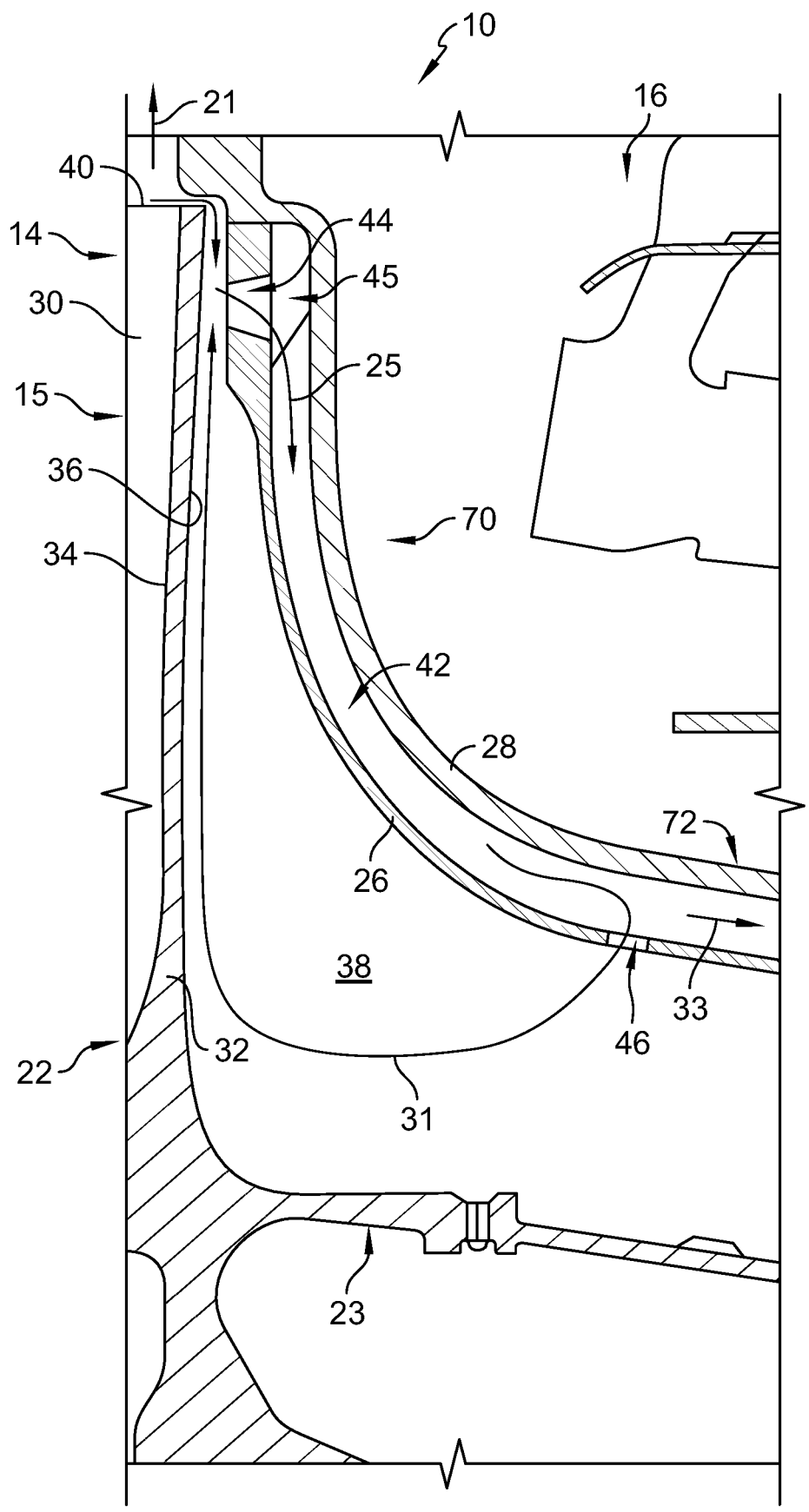
FIG. 4 is an enlarged cross section view of the gas turbine engine of FIG. 1 showing a portion of the impeller and combustor and suggesting that the inner combustor case is formed to define a bleed hole located radially inward from tips of impeller blades and a metering hole located downstream of the bleed hole to direct a portion of cooling air along an aft surface of the impeller and recirculated back into the bleed hole.

The axi-centrifugal compressor 14 has axial compression stages 13 and a centrifugal compression stage 15 as shown in FIG. 1. The centrifugal compression stage 15 includes a centrifugal compressor having a rotor 23 and an impeller 22 and centrifugal compression stage 15 further includes an impeller shroud 24 as shown in FIGS. 2-4. The rotor 23 is mounted for rotation about the axis 11. The impeller 22 is coupled with the rotor 23 for rotation therewith and includes impeller blades 30 and an impeller disk 32. The impeller blades 30 each extend from a forward side 34 of the impeller disk 32. The impeller shroud 24 restricts gases from moving over the impeller blades 30 without interacting with the impeller blades 30.

The centrifugal compressor 15 rotates about the axis 11 to generate the compressed gases and discharged a first portion of the compressed gases 21 from outlet tips of the impeller blades as a compressor discharge air. In the illustrative embodiment, the centrifugal compressor 15 further includes a diffuser 20 coupled to impeller 22 to receive the first portion of the compressed gases 21 from the impeller 22 and discharge the compressor discharge air into the combustor 16.

The combustor 16 is fluidly coupled to the centrifugal compressor and defines a combustion chamber arranged to receive the compressor discharge air as suggested in FIG. 2. The combustor includes an inner combustor case 26, a manifold 28, and an outer combustor case 29 as shown in FIGS. 2 and 3. The inner combustor case 26 defines an inner boundary of the combustion chamber and is arranged along an aft side 36 of the impeller disk 32 to define a back cavity 38 of the centrifugal compressor 15. The manifold 28 is mounted to the inner combustor case 26 and is shaped to define a number of circumferentially spaced apart channels 42 formed radially between the inner combustor case 26 and the manifold 28. The outer combustor case 29 defines an outer boundary of the combustion chamber. The combustor 16 further includes fuel nozzles and combustion liners for combusting the compressor discharge air in the combustion chamber.

Rotation of the impeller 22 about the axis 11 to generate the compressed gases causes an axial force to be applied to the impeller 22. Thrust bearings may be used to receive the axial forces applied to the impeller 22 of the centrifugal compressor. A portion of the compressed gases 21 and other air in the gas turbine engine 10 may be used to apply the counter force onto the impeller 22 to reduce the net axial force acting on the impeller 22 and reduce the load on the thrust bearings. To maximize the counter force while minimizing the amount of the compressed gases used, it is desirable to apply the compressed gases to a large surface area 84 of the centrifugal compressor. One such large surface area 84 is provided by the aft side 36 of the impeller disk 32 by the radial distance between the rotor 23 and the tips of the blades 30.

To control the net axial force acting on the impeller 22, a second portion of the compressed gases 21 is bled from the tips of the impeller blades 30 as bleed air 25 and directed into the back cavity 38 via the number of circumferentially spaced apart channels 42. The bleed air 25 is applied to a relatively large surface area of the aft side 36 of the impeller disk 32 to apply an axially forward force onto the impeller 22. The bleed air 25 is recirculated into the number of circumferentially spaced apart channels 42 and may be directed to the turbine 18 for component cooling.

The inner combustor case 26 is formed to include a number of bleed holes 44 arranged radially inwardly from the outlet tips 40 of the impeller blades as shown in FIGS. 3 and 4. The bleed holes 44 allow for the second portion of the compressed gases 21 (bleed air 25) discharged from the outlet tip of the impeller blades 30 to move radially inward along a portion of the aft side 36 of the impeller disk 32 before moving through the number of bleed holes 44 and into the number of circumferentially spaced apart channels 42. Illustratively, the bleed holes 44 are formed as diffusers that open into an annular plenum 45 defined by the manifold 28 and in fluid communication with the channels 42.

In the illustrative embodiment, the bleed holes 44 extend through the radially extending portion 70 from a forward surface of the inner combustor case 26 to an aft surface as shown in FIGS. 3 and 4. In the illustrative embodiment, the bleed holes 44 are conical in shape. The inlet opening is sized to have a first diameter, while the outlet opening is sized to have a second diameter that is larger than the first diameter of the inlet opening.

The inner combustor case 26 is formed to include a plurality of metering holes 46 that extend through the inner combustor case 26 as shown in FIGS. 3 and 4. The metering holes 46 open into the back cavity 38 to transmit a first amount 31 of the bleed air 25 from the centrifugal compressor into the back cavity 38. The first amount 31 of the bleed air 25 pressurizes the back cavity 38 such that the pressure of the back cavity 38 is applied to the aft side 36 of the impeller disk 32 and to the rotor 23. As suggested in FIG. 3, the pressure of the back cavity 38 is applied onto an annular surface area 84 defined radially between a sealing element 60 and the bleed holes 44.

The radial locations of the bleed holes 44 and the sealing element 60 can be tailored to obtain a desired magnitude for the annular surface area 84 based on the pressure in the back cavity 38 and the desired axial force to apply to the centrifugal compressor. The size and number of the bleed holes 44 and the metering holes 46 may be varied so that a desired amount of bleed air 25, 31 and, thus, pressure is provided to the back cavity 38 for tailoring the axial force applied to the centrifugal compressor.

The back cavity 38 is open fluidly with the number of bleed holes 44 so that a majority of the first amount 31 of the bleed air 25 in the back cavity 38 is recirculated through the number of bleed holes 44 and into the number of circumferentially spaced apart channels 42 as suggested in FIGS. 3 and 4. The back cavity 38 is arranged without a sealing element fluidly between the number of bleed holes 44 and the plurality of metering holes 46. In other words, the first amount 31 of the bleed air 25 is directly conducted into the back cavity 38 via the metering holes 46 and applied directly along the aft side 36 of the impeller disk 32 and to the rotor 23 such that the whole of the pressure of back cavity 38 is applied to the impeller disk 32 and the rotor 23. No seal, protrusion, or other flow restriction element is positioned in the back cavity 38 between the bleed holes 44 and the metering holes 46. Illustratively, the only sealing element in fluid communication with the back cavity 38 is the sealing element 60.

In the illustrative embodiment, at least one bleed hole 44 is configured to provide compressed gases to at least one channel 42 formed by the manifold 28. In other embodiments, at least two bleeds holes 44 may be configured to provide compressed gases to at least one channel 42 formed by the manifold 28.

As discussed in detail below, the inner combustor case 26 cooperates with the turbine 18 to provide a plurality of cavities and passages for providing cooling air to the turbine 18. The number of circumferentially spaced apart channels 42 are configured to direct a second amount 33 of the bleed air (second portion of the compressor discharge air 21) from the centrifugal compressor to at least one of the cavities for cooling the turbine 18 as suggested in FIGS. 3 and 5.

Turning again to the turbine 18, the turbine 18 includes a plurality of bladed rotating wheel assemblies 48 and a plurality of static turbine vane rings that are fixed relative to the axis 11 as suggested in FIGS. 1-3. The hot gases are conducted through the core gas path 19 and interact with the bladed wheel assemblies 48 to cause the bladed wheel assemblies 48 to rotate about the axis 11. Each turbine vane ring 50 includes a plurality of turbine vanes. The turbine vanes 50 are positioned to direct the gases toward the bladed wheel assemblies 48 with a desired orientation.

Each rotating wheel assembly includes a rotor 52, at least one set of turbine blades 54, and a seal 56 as shown in FIGS. 1-4. The rotor 52 is integrally formed with the rotor 23 in the illustrative embodiment and mounted for rotation about the axis 11. The set of turbine blades 54 is coupled to the rotor 52 for rotation therewith. The seal 56 is formed from a forward sealing element 60 and an aft sealing element 62 that engage the inner combustor case 26 to fluidly separate the back cavity 38 of the centrifugal compressor 15 from the turbine 18.

Figure 5:
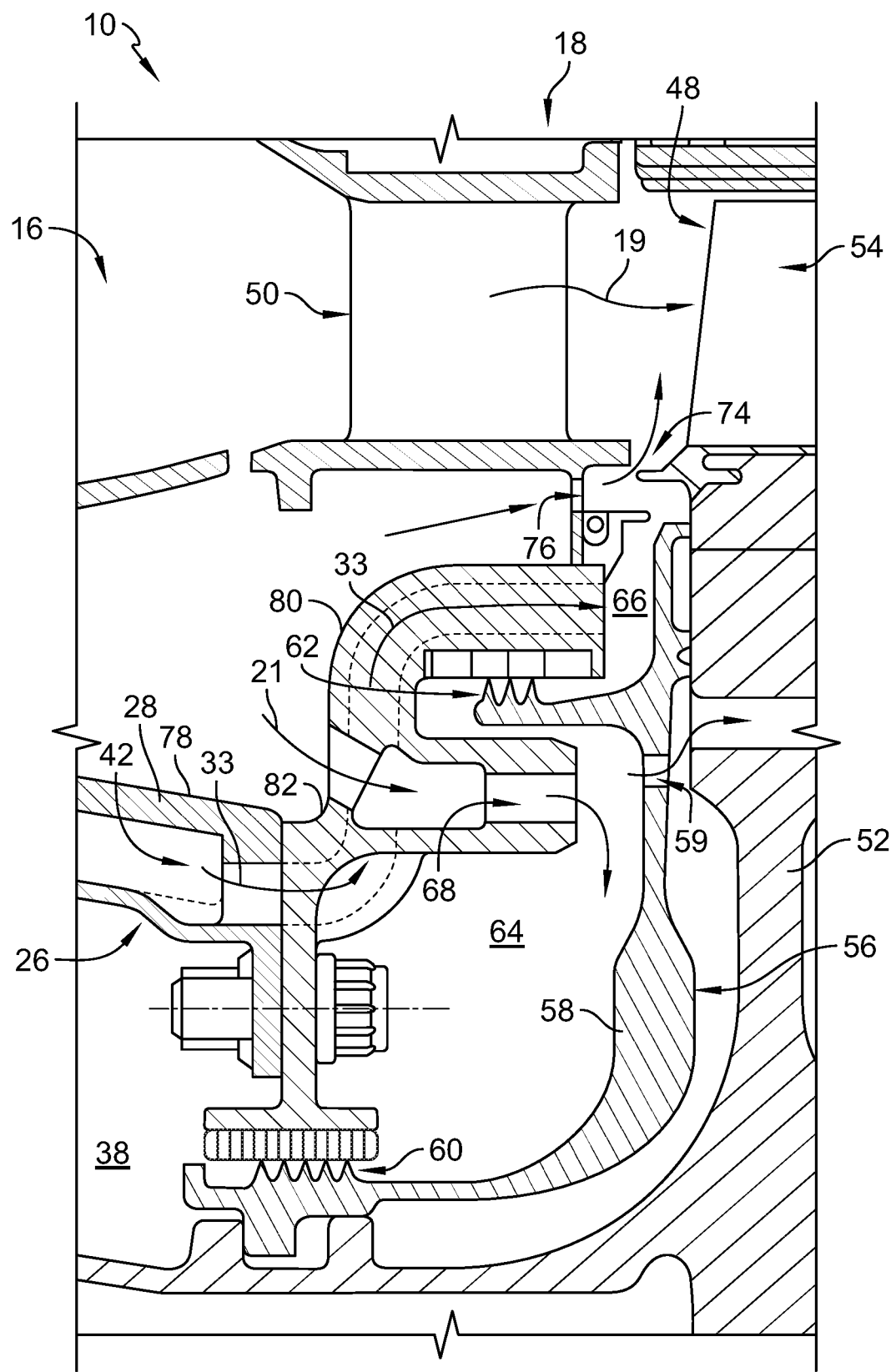
FIG. 5 is an enlarged cross section view of the gas turbine engine of FIG. 1 showing an aft end of the combustor and a portion of the turbine and suggesting that cooling air from the channel is directed into a wheel cavity defined in part by the turbine and that the inner combustor liner is formed with holes and passageways to direct combustion chamber air into the wheel cavity and into an air plenum for cooling components of the turbine.

Illustratively, the seal 56 is formed by a cover plate that includes a body 58, the first sealing element 60, and the second sealing element 62 as shown in FIG. 5. The body 58 is coupled with the rotor 52 and configured to rotate therewith. The first sealing element 60 is coupled with the body 58 and is provided by a plurality of protruding knife seals that interface with a first seal land on the inner combustor case. The second sealing element 62 is coupled with the body 58 and is provided by a plurality of protruding knife seals that interface with a second seal land on the inner combustor case. The body 58 is formed to include a plurality of holes 59 that extend axially through the body 58 to allow air to flow through the body and into holes formed in the rotor 52 of the turbine wheel assembly 48.

The forward sealing element 60 and the aft sealing element 62 of the turbine 18 form an air plenum 64 therebetween. The air plenum 64 is bounded by the inner combustion case and the cover plate in the illustrative embodiment. The air plenum 64 is in fluid communication with the combustor 16 via passageways 68 in the inner combustor case 26 to receive compressor discharge air 21 from the compressor 14 via the combustor 16. In the illustrative embodiment, the forward sealing element 60 is located axially forward of and radially inward of the aft sealing element 62.

The first sealing element 60 defines a portion of the back cavity 38 on a first side of the first sealing element and a portion of the air plenum 64 on a second side of the first sealing element 60 as shown in FIG. 5. The inner combustor case 26 is formed to define the plurality of passageways 68 that extend through the inner combustor case 26 and open fluidly into the air plenum 64 to direct the first amount of the compressor discharge air 21 into the air plenum 64. In the illustrative embodiment, the passageways 68 are circumferentially located between the number of circumferentially spaced apart channels 42 formed by the manifold 28. The compressor discharge air 21 pressurizes the air plenum 64 so that compressor discharge air 21 flows through the holes 59 formed in the body 58 and passes into holes formed in the bladed rotating wheel assembly 48 in the illustrative embodiment.

The second sealing element 62 separates a wheel cavity 66 from the air plenum 64 as suggested in FIG. 5. The wheel cavity 66 has an outlet 74 that opens into the gas path 19 of the turbine 18 upstream of the set of turbine blades 54. The number of circumferentially spaced apart channels 42 are arranged to discharge the second amount 33 of the bleed air 25 into the wheel cavity 66.

The inner combustor case 26 is formed to define a plurality of cooling holes 76 that extend through the inner combustor case 26 and fluidly open into the wheel cavity 66 as shown in FIG. 5. The cooling holes 76 direct a second amount of the compressor discharge air 21 into the wheel cavity 66. The second amount of the compressor discharge air 21 mixes with the second amount 33 of bleed air 25 provided by the channels 42 and exits the wheel cavity 66 through the outlet 74 of the wheel cavity 66.

The illustrative inner combustor case 26 includes a forward case 78 and an aft case 80 as shown in FIGS. 3-5. In other embodiments, the forward case 78 and the aft case 80 are integrally formed. In the illustrative embodiment, the forward case 78 of the inner combustor case 26 includes a radially extending portion 70 and an axially extending portion 72 as shown in FIGS. 3 and 4. The radially extending portion 70 extends radially along the aft side 36 of the impeller disk 32 and is spaced apart from the disk 32 to define a portion of the back cavity 38 therebetween. The axially extending portion 72 extends axially from the radially extending portion and is mounted relative to the turbine 18 to define a portion of the back cavity 38.

The aft case 80 includes a first seal land that interfaces with the sealing element 60, a second seal land that interfaces with the sealing element 62, and an annular body 82 coupled with the forward case 78 as shown in FIG. 5. The annular body 82 is formed to define a portion of the channels 42. The passageways 68 extend through the annular body 82 and are circumferentially offset from the channels 42. The cooling holes 76 extend through the annular body 82. Illustratively, the turbine vane ring 50 is coupled with the annular body 82 as shown in FIG. 5.

According to the disclosure, a method may include rotating the impeller 22 about the axis 11 to produce compressed air. A first portion of the compressed air is directed into a combustor 16 as compressor discharge air 21. The second portion of the compressed air 25 is directed through the plurality of bleed holes 44 formed in an inner combustor case 26 and into the plurality of channels 42 defined by the inner combustor case 26 and the manifold 28 coupled with the inner combustor case 26. The plurality of bleed holes 44 being located radially inward of tips 40 of the impeller blades 30 relative to the axis. A first amount of the compressed air is discharged out of the plurality of channels 42 and into the wheel cavity 66. A second amount of the compressed air 31 is diverted out of the plurality of channels 42 via the plurality of metering holes 46 formed in the inner combustor case 26 and into the back cavity 38, the back cavity 38 being fluidly sealed from the wheel cavity 66. A majority of the second amount of air 31 in the back cavity 38 is recirculated into the plurality of channels 42 via the plurality of bleed holes 44.

Illustratively, a first amount of the first portion of the compressed air 21 is directed into the wheel cavity 66 via the plurality of cooling holes 76 formed in the inner combustor case 26. The air plenum 64 separates the wheel cavity 66 from the back cavity 38. The method may include directing a second amount of the first portion of the compressed air 21 into the air plenum.

The present disclosure addresses problems of simultaneously managing axial thrust bearing load, turbine cooling, and bleed flow in an engine with a centrifugal compressor stage. In conventional engines, sealing compressor stages may be typically accomplished using labyrinth-style seal arrangements that limit the degree to which surrounding, higher-pressure air can be re-inserted into the flow path.

In contrast, the present disclosure, as suggested in FIG. 3, provides high swirl bleed air that leaves the impeller 22 and experiences some static pressure recovery with diffusing bleed holes 44. The diffuser bleed air 25 is directed through transport channels 42 that isolate the air from higher pressure combustor air in the combustor 16. This transported air is then discharged into the wheel cavity 66 for cooling purposes.

The present disclosure uses metering holes 46 to pressurize the back cavity 38 so that an appropriate force can be applied to the impeller 22, which helps achieve desired net bearing thrust load. Instead of controlling load with a forward seal diameter, as is customary in gas turbine engines, the diameter of the holes 46 are adjusted to apply a desired pressure distribution over the maximum area of the impeller 22 and rotor 23.

The air flow 31 used for pressurization of the back cavity 38 is recirculated via bleed holes 44, so its flow rate does not, by itself, control how much bleed air is pulled from the compressor 14. Instead, the sum of dedicated turbine cooling air flow 33, the air flow 31, and any leakage across the seal 60 will be equal to the bleed air flow 25. Should this bleed flow be excessive, an additional source of cooling air from the combustor 16 can be substituted instead.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine engine comprising:
   a centrifugal compressor including an impeller having an impeller disk and impeller blades that extend from the impeller disk, the impeller configured to rotate about an axis to produce compressor discharge air,
   a combustor including an outer combustor case arranged around the axis and an inner combustor case arranged radially along an aft side of the impeller disk and extending axially aft relative to the axis, and
   a turbine including a rotor assembly mounted for rotation about the axis and a turbine blade coupled with the rotor assembly for rotation therewith and defining an inner radial boundary of a gas path of the turbine, the rotor assembly including a body, a first sealing element coupled with the body and engaging the inner combustor case at a first location, and a second sealing element coupled with the body and engaging the inner combustor case at a second location to define an air plenum between the first sealing element and the second sealing element, the second sealing element fluidly separates the air plenum from a wheel cavity defined between the inner combustor case and the rotor assembly, and the wheel cavity opens into the gas path of the turbine,
   wherein the inner combustor case is formed to include a cooling hole that extends through the inner combustor case and opens directly into the wheel cavity to direct a first portion of the compressor discharge air through the wheel cavity and into the gas path of the turbine,
   wherein the inner combustor case is formed to include a bleed hole arranged radially inwardly from outlet tips of the impeller blades to allow a flow of bleed air that is bled from the compressor discharge air to pass through the bleed hole and along the inner combustor case, and
   wherein the combustor further includes a manifold arranged along the inner combustor case and shaped to define a channel formed radially between the inner combustor case and the manifold and the flow of bleed air is conducted into the channel.

2. The turbine engine of claim 1, wherein the inner combustor case is formed to define a passageway that extends through the inner combustor case and opens into the air plenum to direct a second portion of the compressor discharge air from the combustor directly into the air plenum.

3. The turbine engine of claim 2, wherein the rotor assembly is formed to include a hole that allows the second portion of the compressor discharge air in the air plenum to flow out of the air plenum and into the rotor assembly to cool the rotor assembly of the turbine.

4. The turbine engine of claim 1, wherein the cooling hole extends axially through the inner combustor case and the first portion of the compressor discharge air in the wheel cavity flows radially outwardly into the gas path.

5. The turbine engine of claim 1, wherein the channel conducts a first portion of the flow of bleed air directly into the wheel cavity.

6. The turbine engine of claim 1, wherein the aft side of the impeller disk and the inner combustor case cooperate to define a back cavity therebetween and wherein the first sealing element fluidly separates the air plenum from the back cavity.

7. The turbine engine of claim 6, wherein the inner combustor case is formed to include a metering hole that extends through the inner combustor case and is in fluid communication with the back cavity to transmit a second portion of the flow of bleed air from the channel into the back cavity.

8. The turbine engine of claim 7, wherein the bleed hole, the metering hole, and the back cavity are fluidly unobstructed to allow the second portion of the flow of bleed air to circulate from the metering hole, through the back cavity, and into the bleed hole.

9. A turbine engine comprising:
   a centrifugal compressor including an impeller having an impeller disk and impeller blades that extend from the impeller disk, the impeller configured to rotate about an axis to produce compressor discharge air,
   a combustor arranged to receive the compressor discharge air and including an inner combustor case arranged at least along an aft side of the impeller disk, and
   a rotating turbine wheel assembly configured for rotation about the axis, the rotating turbine wheel assembly includes a turbine blade located in a gas path of the turbine engine and a first sealing element that cooperates with the inner combustor case to define a wheel cavity having an outlet that opens into the gas path,
   wherein the inner combustor case is formed to include a cooling hole that extends through the inner combustor case and opens directly into the wheel cavity to direct a first portion of the compressor discharge air from the combustor into the wheel cavity, and
   wherein the combustor further includes a manifold arranged along the inner combustor case and shaped to define a channel formed radially between the inner combustor case and the manifold, the inner combustor case is formed to include a bleed hole arranged radially inwardly from outlet tips of the impeller blades, and the bleed hole opens fluidly into the channel.

10. The turbine engine of claim 9, wherein the rotating turbine wheel assembly further includes a second sealing element that cooperates with the inner combustor case to define an air plenum between the first sealing element and the second sealing element and wherein the second sealing element fluidly separates the air plenum from t wheel cavity.

11. The turbine engine of claim 10, wherein the inner combustor case is formed to define a passageway that extends through the inner combustor case and opens directly into the air plenum to direct a second portion of the compressor discharge air from the combustor into the air plenum.

12. The turbine engine of claim 11, wherein the rotating turbine wheel assembly includes a rotor coupled with the turbine blade and a cover plate coupled with the rotor and the cover plate is formed to include a hole that extends through the cover plate to direct the second portion of the compressor discharge air from the air plenum toward the rotor.

13. The turbine engine of claim 9, wherein the inner combustor case includes a forward case and an aft case, the forward case having a radially extending portion that extends radially along the aft side of the impeller disk and an axially extending portion that extends axially aft from the radially extending portion, and the aft case having a first seal land that interfaces with the first sealing element and an annular body coupled with the forward case, and wherein the cooling hole extends through the annular body of the aft case of the inner combustor case.

14. The turbine engine of claim 9, wherein the channel is in fluid communication with the wheel cavity.

15. A method comprising:
rotating an impeller about an axis to produce compressor discharge air, the impeller having an impeller disk and impeller blades that extend away from the impeller disk,
discharging the compressor discharge air from outlet tips of the impeller blades,
directing a first portion of the compressor discharge air through a cooling hole formed in an inner combustor case and into a wheel cavity defined by the inner combustor case and a rotating turbine wheel assembly,
directing a second portion of the compressor discharge air through a passageway formed in the inner combustor case and into an air plenum that is separated from the wheel cavity by a sealing element,
directing the first portion of the compressor discharge air out of the wheel cavity through an outlet that opens into a gas path of the rotating turbine wheel assembly, and
bleeding bleed air from the outlet tips of the impeller blades through a plurality of bleed holes formed in the inner combustor case and into a channel defined by the inner combustor case and a manifold coupled with the inner combustor case, the plurality of bleed holes being located radially inward of the outlet tips of the impeller blades relative to the axis.

16. The method of claim 15, further comprising directing a first portion of the bleed air from the channel into the wheel cavity.

* * * * *